(12) United States Patent
Duppong

(10) Patent No.: US 6,925,407 B2
(45) Date of Patent: Aug. 2, 2005

(54) CONTROLLER WITH INTERFACE ATTACHMENT

(75) Inventor: Charles M. Duppong, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/751,651

(22) Filed: Jan. 6, 2004

(65) Prior Publication Data

US 2004/0209531 A1 Oct. 21, 2004

Related U.S. Application Data

(63) Continuation of application No. 09/350,894, filed on Jul. 12, 1999, now Pat. No. 6,687,814.

(51) Int. Cl.⁷ .............................................. G06F 15/177
(52) U.S. Cl. ....................................... 702/119; 702/121
(58) Field of Search ................. 702/117–120, 121–123; 710/8; 713/1, 100

(56) References Cited

U.S. PATENT DOCUMENTS

| 4,701,845 A | 10/1987 | Andreasen et al. |
| 5,195,033 A | 3/1993 | Samph et al. |
| 5,615,344 A | 3/1997 | Corder |
| 5,771,474 A | 6/1998 | Matt et al. |
| 5,815,426 A | 9/1998 | Jigour et al. |
| 5,818,428 A | 10/1998 | Eisenbrandt et al. |
| 5,819,050 A | 10/1998 | Boehling et al. |
| 6,009,480 A | 12/1999 | Pieso |
| 6,292,422 B1 | 9/2001 | Pitts |
| 6,353,870 B1 | 3/2002 | Mills et al. |
| 6,370,603 B1 | 4/2002 | Silverman et al. |
| 6,687,814 B1 * | 2/2004 | Duppong ........................ 713/1 |

FOREIGN PATENT DOCUMENTS

| JP | 08316329 A | 11/1996 |
| JP | 11250675 | * 9/1999 |

OTHER PUBLICATIONS

P. Chou, et al., "Synthesis of the hardware/software interface in microcontroller–based system", IEEE Computer Society Press, pp. 488–495 Series–Proceeding–Article, 1992.

* cited by examiner

*Primary Examiner*—Marc S. Hoff
*Assistant Examiner*—Craig Steven Miller
(74) *Attorney, Agent, or Firm*—Dickstein Shapiro Morin & Oshinsky LLP

(57) ABSTRACT

A controller with attachments for controlling specific electronic circuits is disclosed. Each attachment has a connector connectable to the electronic circuit to be controlled, and a memory accessible by the controller that contains configuration data for accessing the electronic circuit, and operational software for operating the electronic circuit.

17 Claims, 9 Drawing Sheets

CONTROLLER WITH INTERFACE ATTACHMENT

This application is a continuation of U.S. application Ser. No. 9/350,894, filed Jul. 7, 1999, now U.S. Pat. No. 6,687,814.

BACKGROUND OF THE INVENTION

1. Field of the Invention

This invention relates to application specific attachments allowing communication and control between a portable universal controller and a controlled application device.

2. Background of the Invention

Processes and machines routinely incorporate electronics for control and monitoring. The electronics for such processes and machines is typically localized and application specific. Often related local processes or machines are networked for the purposes of central control or monitoring of the larger system, process or machine of which they are a part.

A characteristic of all of the aforementioned processes, machines and systems is that specific equipment is controlled by electronic circuits, which may be formed as circuit boards, circuit modules, integrated circuits, chips or dies, etc. These electronic circuits are manufactured to suit specific needs and perform application specific functions and consequently have different circuitry and mounting systems. Consequently, each electronic circuit requires an associated application specific controller for the purposes of operating, monitoring, controlling, testing, debugging, programming, registering, initialization, identification, etc.

In many situations, it is inefficient to maintain all the different controllers that are required to control a broad range of electronic circuits. Therefore, there is a need for a portable, universal controller. A practical portable, universal controller must overcome several problems. Because electronic circuits have different functions, are from different manufacturers, and are installed at different periods, the nature of the electronics, software, and electronic interface may be very different.

The controller will also have to accommodate many different types of connectors depending on the nature of the electronic communication with respect to both types and number of contacts and the physical shape of the connectors used in peripheral equipment. It can be seen that any portable controller that is burdened with all of the software, communication electronics and connectors required to effectively operate a useful range of electronic circuits, or all of the localized equipment in a given system, will be complex and expensive. Moreover, it would be inflexible and unable to easily accommodate new localized equipment. What is required is a portable controller that practically and effectively will operate diverse electronic circuits.

SUMMARY OF THE INVENTION

The present invention meets the need for a single, practical, flexible and universal portable controller for controlling different electronic circuits, such as circuit boards, circuit modules, integrated circuits, chips, dies, etc. The invention includes a processor based portable controller which includes a reconfigurable programmable logic device. An application specific attachment is connected to both the universal controller and an electronic circuit. The attachment has a connector compatible with the I/O terminal of the electronic circuit and a memory which contains configuration data for electronically accessing the electronic circuit and operational software for operating the electronic circuit. The universal controller reads the configuration data of the electronic circuit from the memory of the application attachment and configures the programmable logic device giving the controller access to the electronic circuit. The universal controller also reads the operational software from the application attachment's memory and implements the operational software in order to control the electronic circuit. The universal controller may be used to operate, debug, control, program, initialize, identify, monitor, test, or register an electronic circuit. Those skilled in the art with appreciate the many, varied uses for the universal controller.

The advantages and features of the invention will be more readily understood from the following detailed description of the invention, which is provided in connection with the accompanying drawings.

DETAILED DESCRIPTION OF PREFERRED EMBODIMENTS

Figure 1:
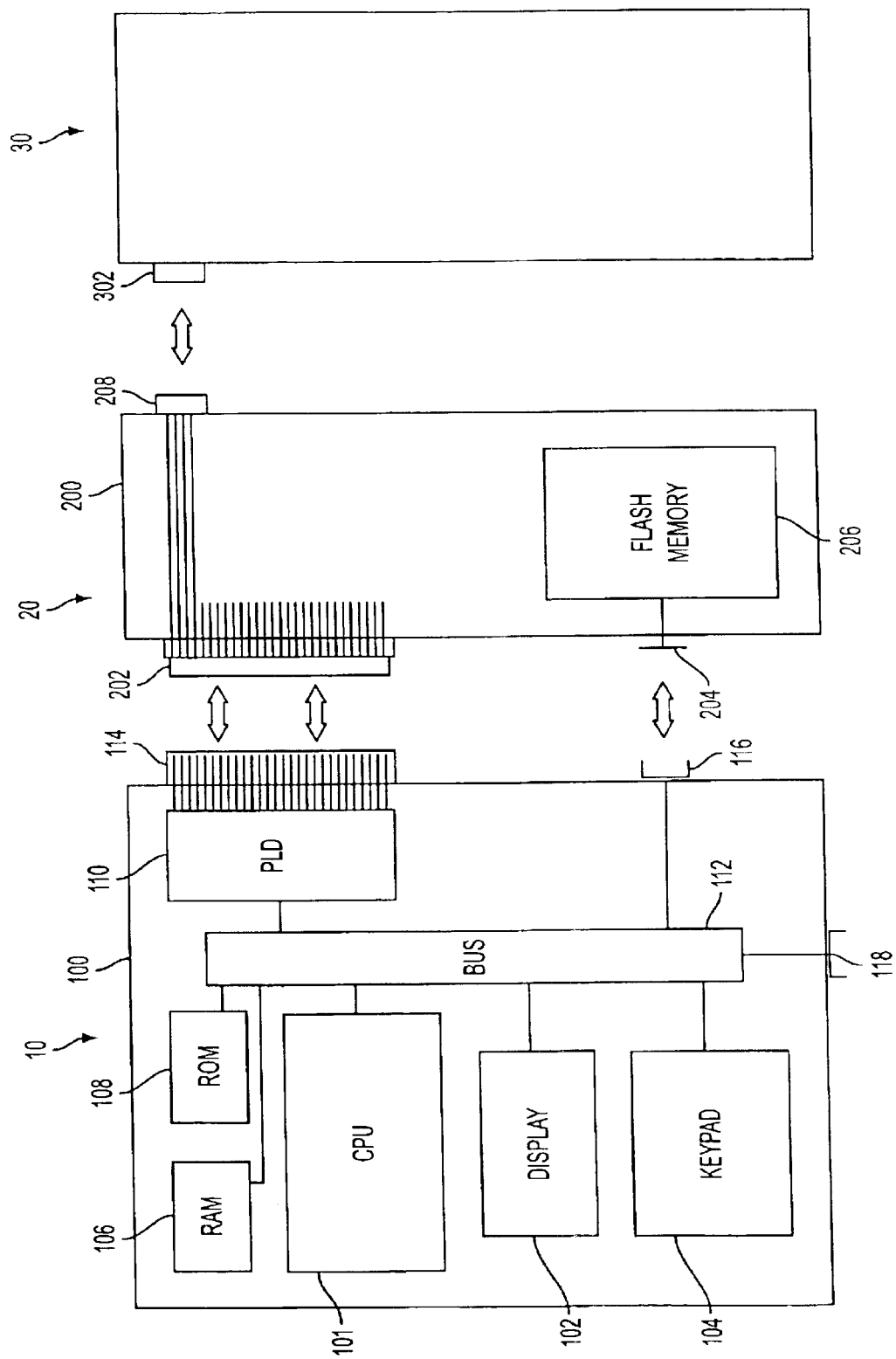
FIG. 1 is a schematic block diagram of a controller with an interface attachment.

Referring to FIG. 1, a universal controller system is illustrated which includes a portable, universal controller 10 and an application attachment 20. Also illustrated is an electronic circuit 30 which is to be controlled.

The universal controller 10 includes a housing 100, a CPU 101, a display 102, such as an LCD, a keypad 104, random access memory 106, read only memory 108, a reconfigurable programmable logic device 110, an internal communication bus system 112, a multi-pin socket connector 114, an application input/output connector 116, and a second input/output connector 118. All of the elements of the universal controller 10 are connected to, and operate through, the internal communications bus system 112, except the multi-pin connector 114, which is connected to the reconfigurable programmable logic device 110.

Each application attachment 20 includes a housing 200, a multi-pin plug connector 202, an input/output connector 204, a non-volatile memory 206, for example, a flash memory, and an application connector 208. The flash memory 206 stores the operational software and application configuration data necessary for the electronic circuit 30. The multi-pin plug connector 202 of the application attachment 20 is internally connected with the application connector 208. The application connector 208 may be mounted on housing 200 or attached to the application attachment 20 by a cable, depending on the characteristics of the electronic circuit 30. The multi-pin socket connector 114 of the universal controller 10 and the multi-pin plug connector 202 of the application attachment 20 must each have enough terminals to conform to the electronic circuit 30 with the largest number of terminals expected. Often, other electronic circuits 30 expected to the used with the universal controller 10 will require a smaller number of terminals. Thus, the application connector 208 will often have less terminals than the multi-pin plug connector 202.

The application connector 208 is connected to the multi-pin connector on a terminal-to-terminal basis until all the terminals of the application specific connector 208 are exhausted, sometimes leaving some of the pins of the multi-pin plug connector 202 unconnected. In the example shown, the electronic circuit 30 requires less than all of the terminals of multi-pin socket connector 202.

The flash memory 206 is connected to the input/output connector 204. The multi-pin connector 202 and input/output connector 204 are located on the housing 200 of the application specific attachment 20, and the multi-pin connector 114 and application input/output connector 116 are located on the housing 100 of the universal controller 10, in a manner that they engage together when the application specific attachment is attached to the universal controller 10. The application attachment 20 may also mechanically attach to the universal controller 10 in any one of many ways known in the art.

In an alternative embodiment of the invention, input/output connector 116 of the universal controller 10, and input/output connector 204 of the application attachment 20 may be part of multi-pin socket connector 114 and multi-pin plug connector 202, respectively. In this embodiment, a signal connector pair is used to provide the required signal paths for the invention.

The electronic circuit 30 may be a circuit board, circuit module, integrated circuit, chip, die, etc. That is, the electronic circuit 30 can be any type of electronic circuit, in any form, which can be operated on in any way, for example, programmed, monitored, tested, debugged, registered, initialized, identified, controlled, etc. The electronic circuit has a connector 302 electronically connected to it.

In practice, when it is desired to operate an electronic circuit 30, an application attachment 20 matching the electronic circuit 30 is attached to the universal controller 10 and to the electronic circuit 30. Connections between the controller and the attachment which are not needed for accessing configuration or operational software are kept in a passive state until a valid configuration is established. Data and one or more programs relating to the electronic circuit 30 prestored in flash memory 206 are loaded into RAM 106 for use by CPU 101. CPU 101 runs the programs transferred from flash memory 206 using the transferred data to configure PLD 110 and conduct the predetermined operations on electronic circuit 30. Since all control software and data for an electronic circuit are stored in application attachment 20, an operator need merely choose a new application attachment 20 when the operator desires to use the universal controller 10 with a different electronic circuit 30.

Figure 2:
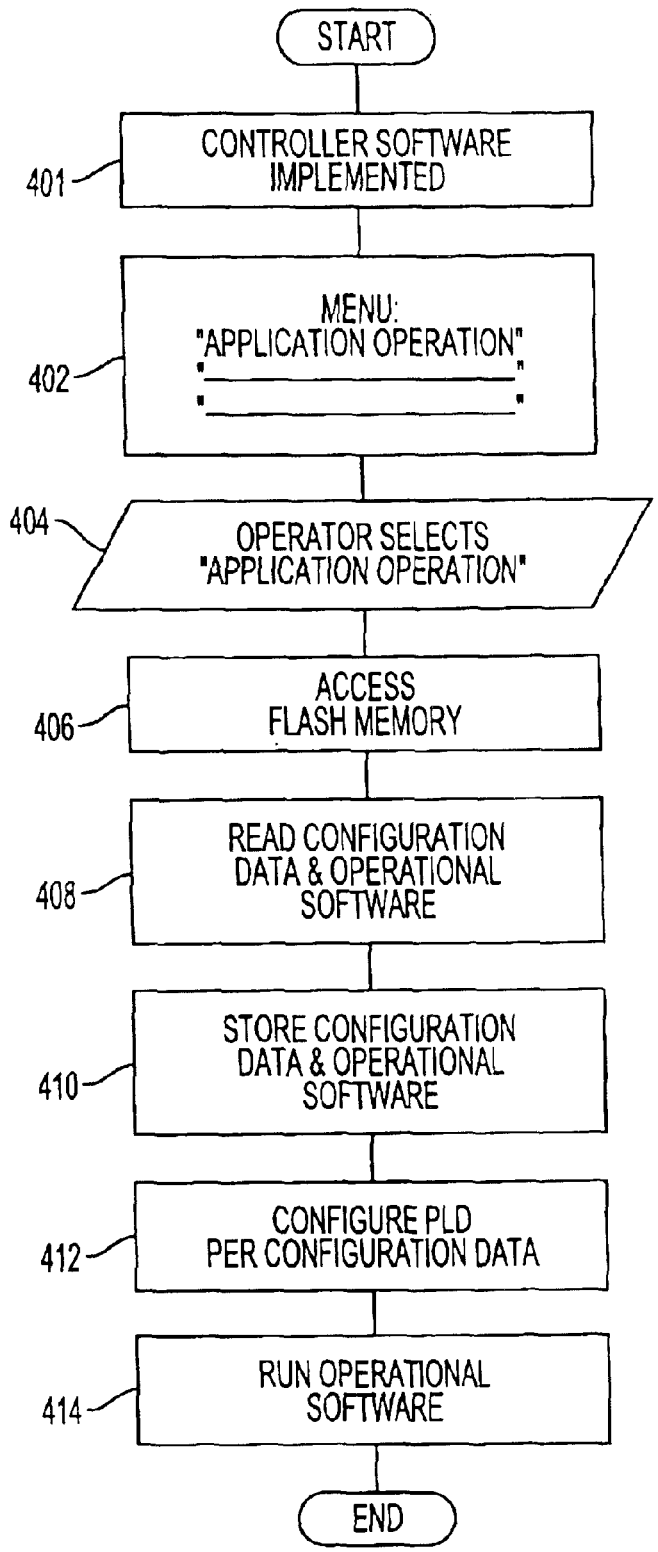
FIG. 2 is a flow chart of the operation of an electronic circuit by a controller with an interface attachment.

Referring to FIG. 2, the overall control program executed by CPU 101 is shown. Upon powering on, the universal controller implements at step 401 the universal controller's operations software, which causes a menu of operations to appear on display 102 at step 402. One of the entries on the menu is "Application Operation." Other entries will be for other operations of the universal controller 10, such as self diagnostic routines and the like. An operator then responds at step 404 with the appropriate keystroke to select application operation. In response, CPU 101 accesses at step 406 the flash memory 206 through the universal bus 112, reads the configuration data and operational software for the electronic circuit 30 stored in the flash memory 206 at step 408, and loads the configuration data and operational software in random access memory 106 at step 410. CPU 101 then configures PLD 110 according to the application's configuration data at step 412. With this configuration, data and address signals will be properly routed between various source pins of connector 302 and the address and data lines of the internal communication bus system 112. CPU 101 then runs the application software at step 414 causing operation of the electronic circuit 30. With appropriate software, memory and processing capacity, the universal controller can be used for any type of operation which can be performed on any electronic circuit. Once operation of the electronic circuit 30 is completed, the universal controller 10 can be turned off and disconnected, or left connected for another operation.

Figure 3:
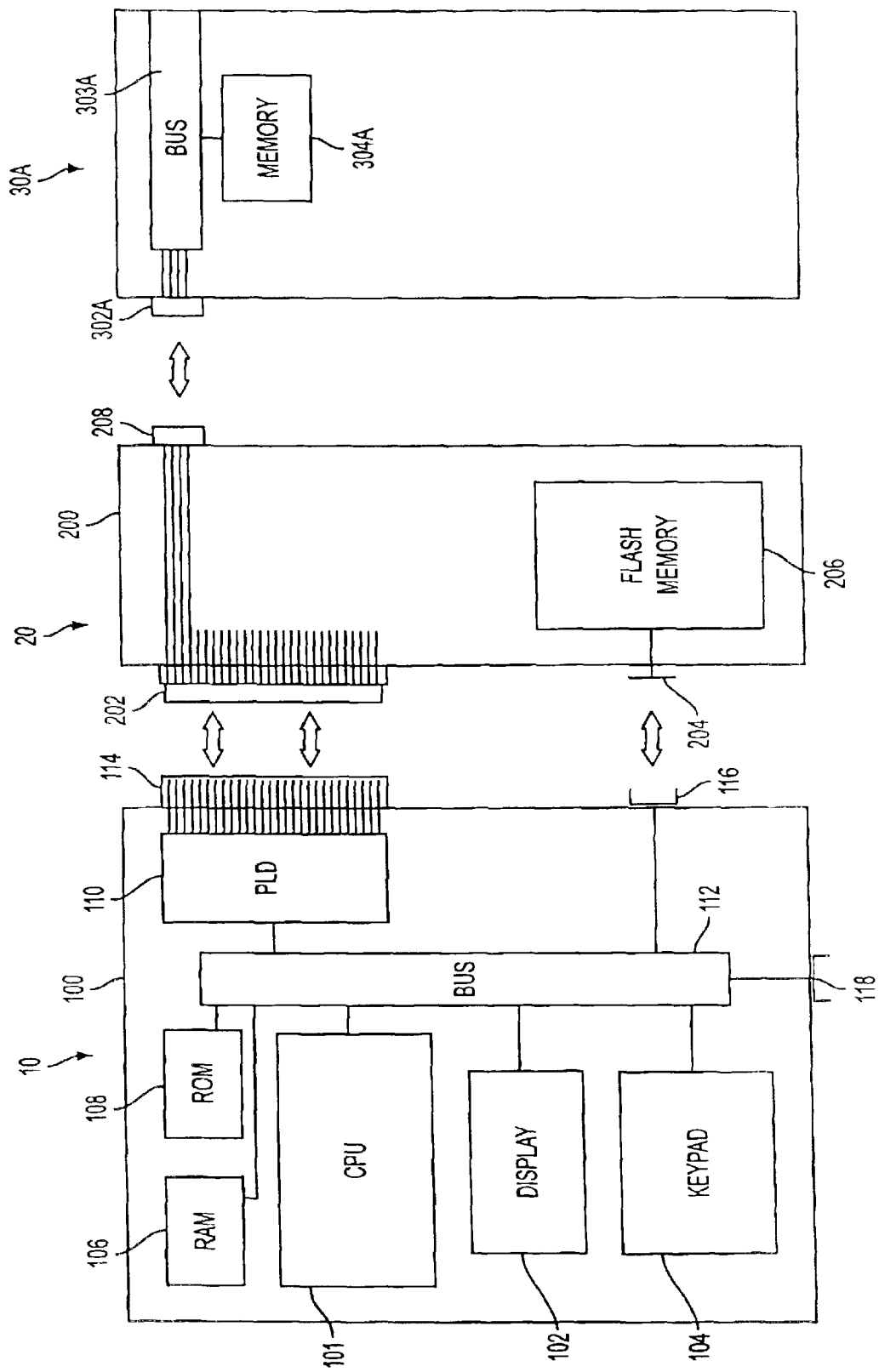
FIG. 3 is a schematic block diagram of the testing of an electronic circuit by a controller with an interface attachment.

An example of a specific application with which the invention can be used is to test the erase time of an electronic circuit in the form of a memory device 304, as shown in FIG. 3. In this example, a particular electronic circuit 30A has, among other things, a four terminal connector 302A, an internal bus 303A, and a memory device 304A.

The operator selects the appropriate application attachment. The application specific connector 208 of the application attachment 20 is a four terminal connector that matches the application connector 302A. Contained in the flash memory 206 of the application attachment 20 are the configuration data for the application connector 302A, internal bus 303A, and a program for testing the erase time of the memory device 304A of the electronic circuit 30A. The operator attaches the application attachment 20 to the universal controller 10 and attaches the application connector 208 of the application attachment 20 to the application connector 302A of the electronic circuit 30A. When the operator initiates the test routine, CPU 101 of the controller 10 accesses and reads the flash memory for the configuration data and operational software for the electronic circuit 30A. Based on the configuration data, CPU 101 configures PLD 110 to route signals from the appropriate address and data lines of internal communication bus system 112 through to the appropriate terminals of multi-pin socket connector 114 of the universal controller 10 and multi-pin plug connector 202 of the application attachment 20, through to application connector 208 of the application attachment 20, through to application connector 302A of the electronic circuit 30A. The universal controller 10 then initiates the erase time test program contained in the operational software. Under the test program, the time required to completely access the memory device 304A and erase it is recorded and compared to a standard, and a pass/fail indication appears on the display 102. The operational software could also include other memory-related routines, such as a check for bad memory locations. With changes in software, the universal controller 10 could also be used to program, debug, identify, monitor, initialize, register, test or otherwise control the memory device 304A.

Figure 3A:
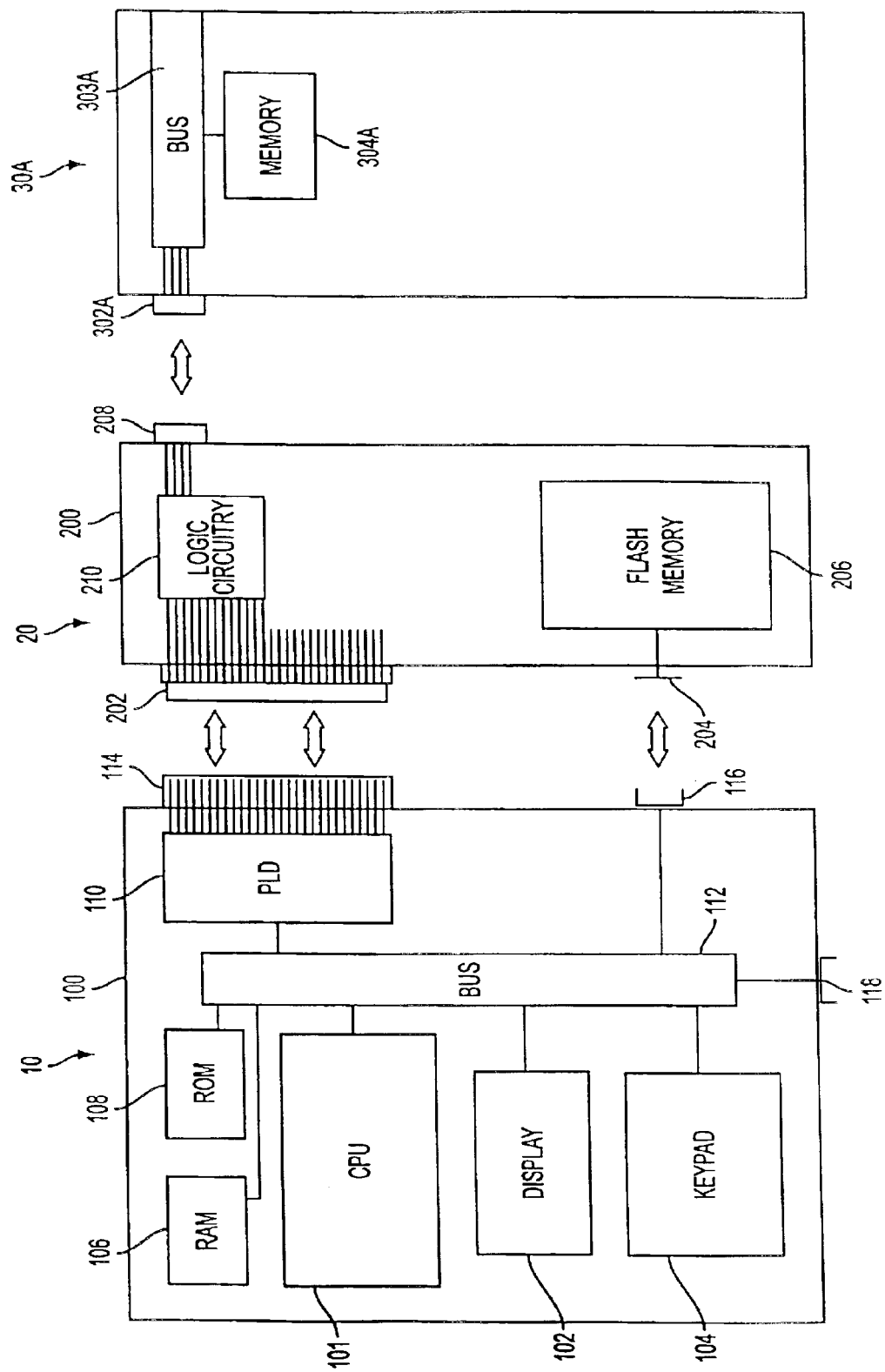
FIG. 3A is a schematic block diagram of the control of an electronic circuit by a controller with an interface attachment.

In another embodiment of the invention illustrated in FIG. 3A, the direct connections between multi-pin plug connector 202 of the application attachment 20 and application connector 208 of the application attachment 20 are replaced by logic circuitry 210. The logic circuitry 210 may afford direct connections, logic connections or a combination of both direct and logic connections, as will be understood by those skilled in the art.

Figure 4:
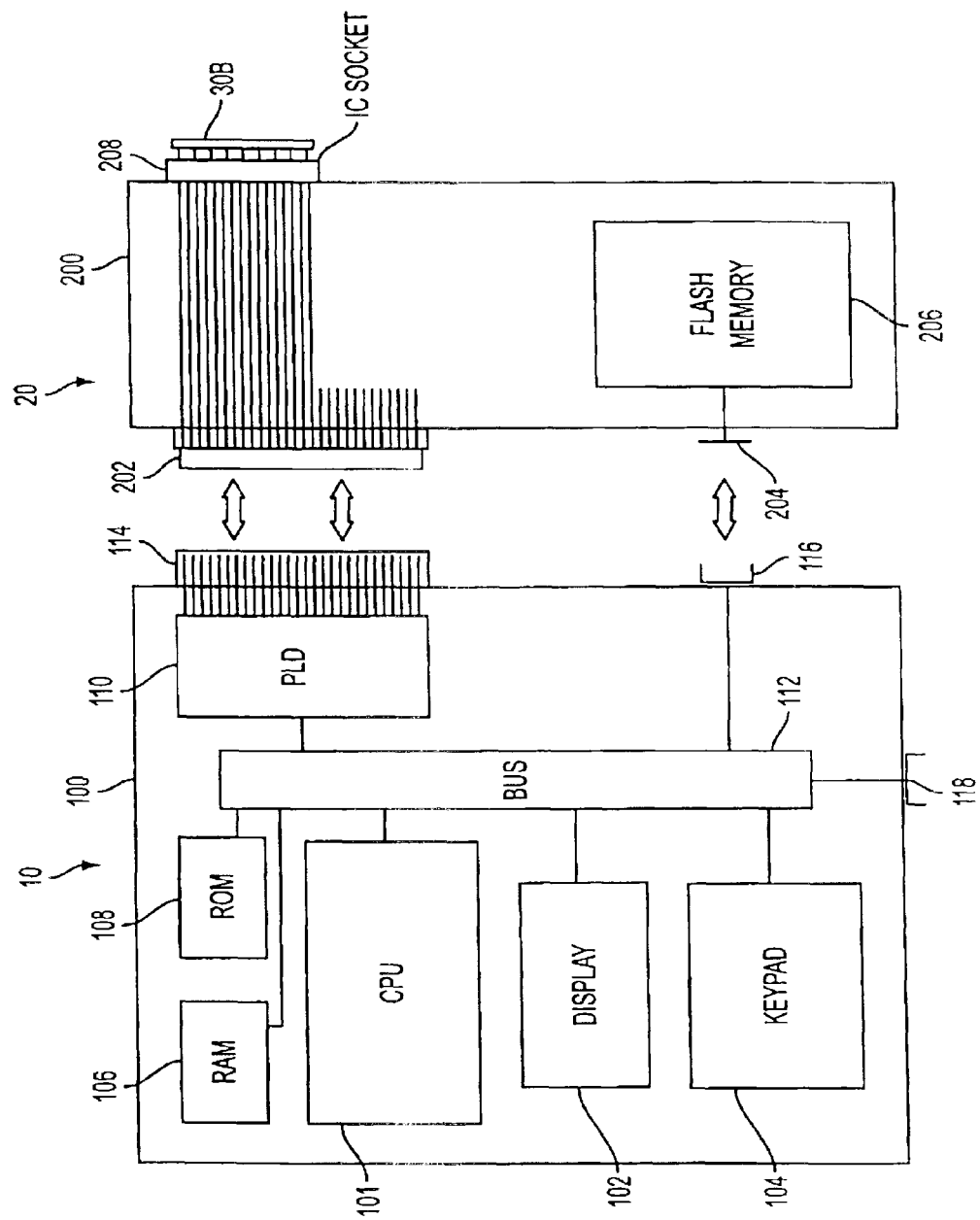
FIG. 4 is a schematic block diagram of the operation of an electronic circuit in the form of an integrated circuit by a controller with an interface attachment.

In another embodiment of the invention illustrated in FIG. 4, the universal controller 10 is used to operate electronic circuits in the form of integrated circuits, or similar electronic circuits. These integrated circuits could be newly manufactured or removed from an existing electronic environment. In this embodiment, the application connector 208 is an integrated circuit socket appropriate for the integrated circuits in question. The integrated circuit socket is situated on the housing 200 of the application attachment 20 and connects directly to the application connector 208.

Figure 4A:
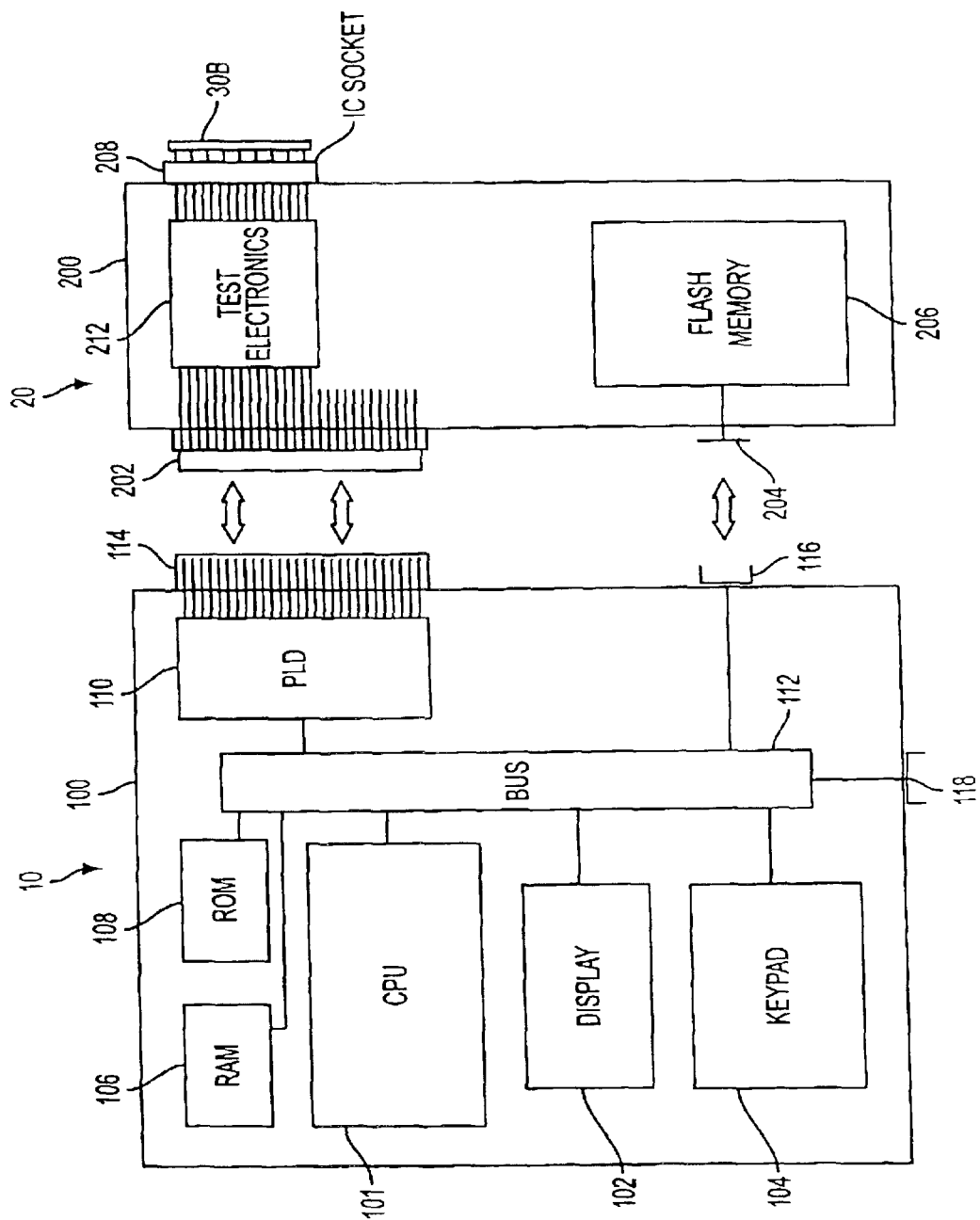
FIG. 4A is a schematic block diagram of the testing of an integrated circuit by a controller with an interface attachment.

In another embodiment of the invention illustrated in FIG. 4A, the direct connections between multi-pin plug connector 202 of the application attachment 20 and application connector 208 of the application attachment 20 is replaced by IC testing electronics 212, which incorporate direct and/or logic connections and testing hardware suitable for testing integrated circuit application 30B, as will be understood by those skilled in the art.

Figure 5:
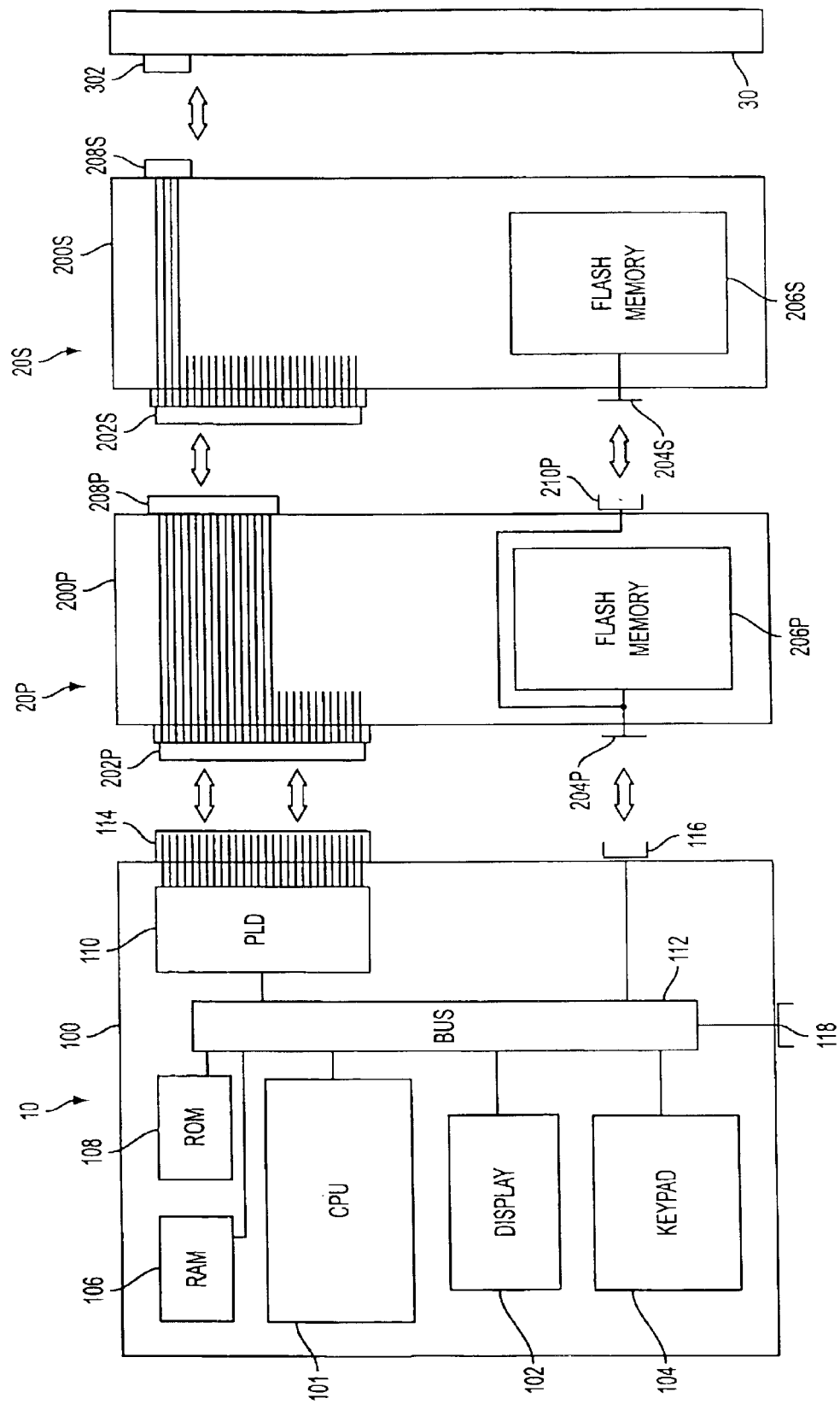
FIG. 5 is a schematic block diagram of a controller with application attachments used in series.

In another embodiment of the invention illustrated in FIG. 5, attachments may be used in series to accommodate families of applications. This approach will be most useful when certain electronic circuits share basic characteristics but have minor software or hardware differences. In this embodiment, a primary application attachment 20P will include a multi-pin plug connector 202P for connection with the universal controller 10 and a multi-pin sub-connector 208P of adequate capacity for the designated family of electronic circuits. Also included will be a flash memory 206P holding at least the configuration data for the sub-connector 208P, and possibly configuration data for the ultimate electronic circuit 30. The flash memory 206P may also hold operational programming for the ultimate electronic circuit 30. The primary application attachment 20P may also have a second input/output connector 210P internally connected to the first input/output connector 204P.

The secondary application attachment 20S has a multi-pin connector 202S that matches the multi-pin sub-connector 208P of the primary application attachment 20P. An application connector 208S is provided and is electrically connected to the multi-pin connector 202S, terminal for terminal until the terminals of the application connector 208S are exhausted. The secondary application attachment 20S may also have a flash memory 206S containing configuration data and operational programs for the particular electronic circuit 30.

Figure 6:
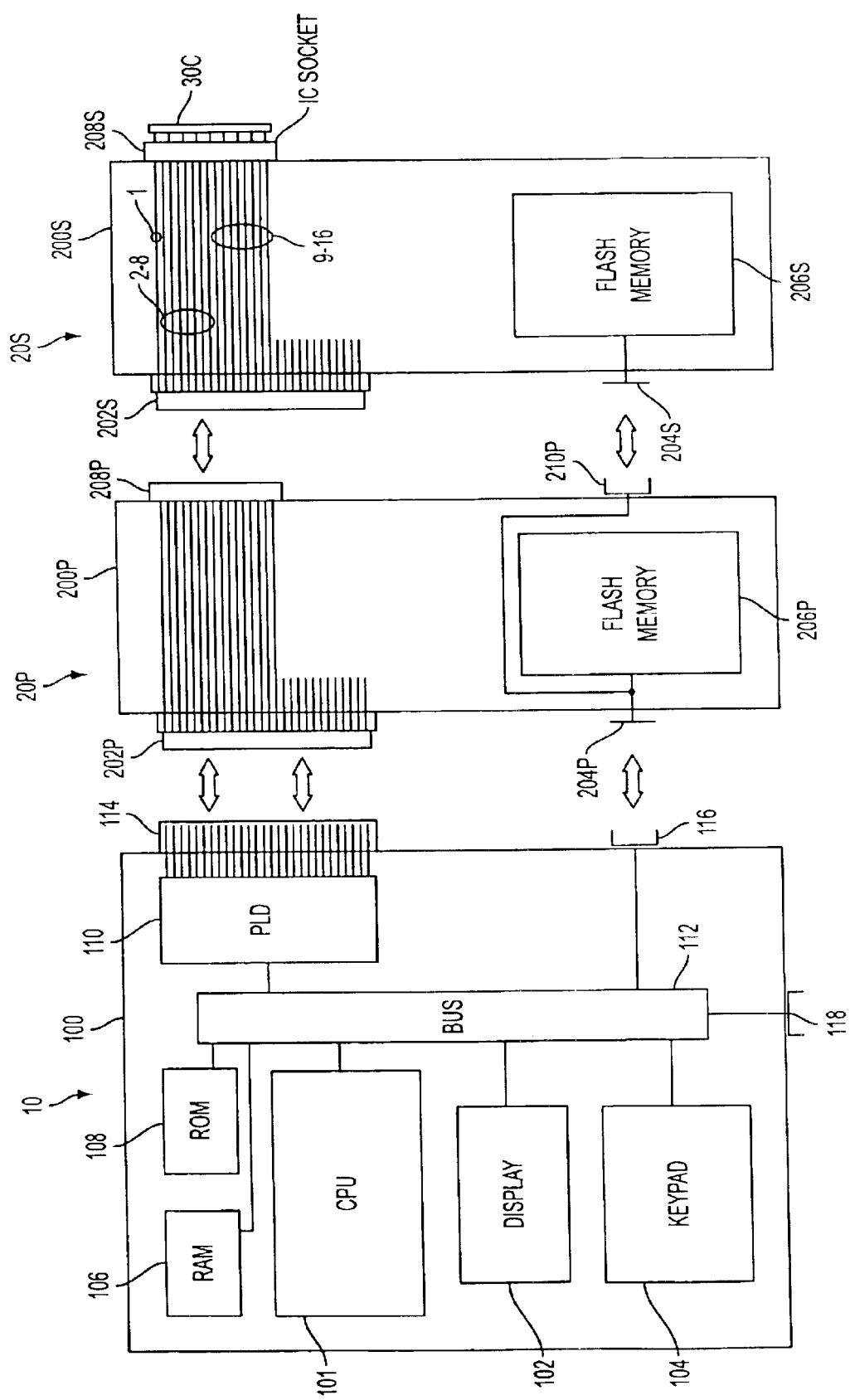
FIG. 6 is a schematic block diagram of a controller for operating an electronic circuit in the form of an integrated circuit with application attachments used in series.

As an example, a series attachment system would be useful when dealing with families of electronic circuits 30, such as integrated circuits, with identical electronics but different sockets, as shown in FIG. 6. In this example, the flash memory 206P of the primary application attachment 20P would hold the operation programming for a family of electronic circuits 30 (here integrated circuits). The flash memory 206S of the secondary application attachment would hold the configuration data for the specific electronic circuit 30. For example, the configuration data for a particular 16 pin integrated circuit 30C would route the address and data lines of the internal communication bus system 112 to the appropriate power pin 1, input pins 2 through 8, and output pins 9 through 16.

In another example, series attachments can be used for monitoring electronic circuits having analog sensors. In this example, an analog/digital converter, required for each electronic circuit, would be included in the primary application attachment 20P. The memory 206S of the secondary application attachment 20S would contain the configuration data and operations software specific to each electronic circuit.

Electronic circuits requiring supervoltages to operate may also be efficiently operated through series attachments. For example, a supervoltage is required to access test modes of certain dynamic random access memories (DRAMs). For these type of applications, the primary application attachment could include a voltage pump for multiplexing a supervoltage with logic signals, and any software necessary for this operation would be included in the flash memory of the primary application attachment. In this example, the secondary application attachments would have the appropriate connector, configuration data, and operation software for the particular electronic circuit, e.g. a memory device.

Those skilled in the art will appreciate that the examples used to illustrate series attachment could also be implemented with a single attachment. Such choices will depend on the particular economies of scale for each type of application.

A useful feature of the invention is its adaptability to custom applications, including one-time applications. For custom applications, attachments could be produced with unprogrammed flash memory and a specific connector that is likely to be used. An alternative would be to produce these unprogrammed attachments with several widely used connectors. Another alternative would be to produce the attachments with screw or similar terminals to allow any connector required to be connected to the multi-pin connector of the attachment.

Figure 7:
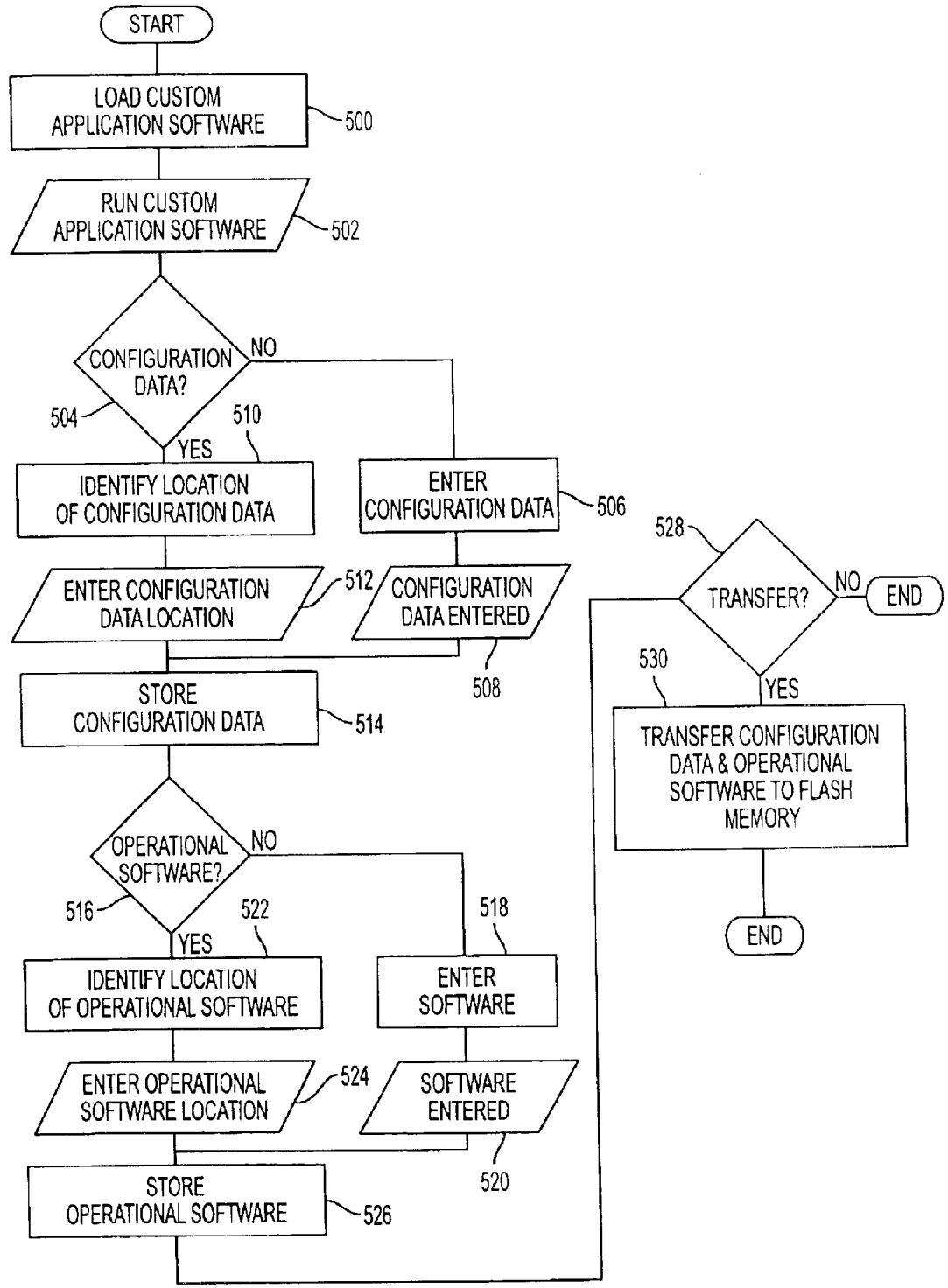
FIG. 7 is a flow chart of the programming of a custom application attachment.

A personal computer or similar device can be used to program the flash memory of the attachment with the appropriate software and configuration data. Referring to FIG. 7, the operator would first load at step 500 and implement at step 502 the custom application software in the personal computer. When running, the program first will inquire at step 504 on the availability of a record of the configuration data for the application. If no record is available, the program will prompt the operator at step 506 to enter manually at step 508 the configuration data, which will be stored in the computer's memory at step 514. If a record is available, the program will prompt to operator at step 510 to identify its location (which drive) at step 512, and the configuration data will be stored in the computer's memory at step 514.

The program then will inquire at step 516 on the availability of operational software for the application. If no software is available, the program will prompt at step 518 the operator to enter manually at step 520 the operational software which will be stored at step 526 in the computer's memory. If a record is available, the program will prompt at step 522 the operator to identify at step 524 its location, and the operational software will be stored at step 526 in the computer's memory.

The program then will inquire at step 528 whether the configuration data and operational software should be transferred to the application attachment. If no, the program will end. If yes, the program will transfer at step 530 the configuration data and operational software to the flash memory 206 of the attachment 20 via a connection to the input-output port 204 of the attachment 20, or through terminals of connector 202, if a separate input-output port 204 is not used.

The present invention provides a portable universal controller which can operate different types of electronic circuits using an application attachment for each different type of electronic circuit that provides the specific connection, configuration data and operational software required to control a specific electronic circuit. By providing the application specific data in an attachment, the present invention constitutes a flexible, truly universal controller for electronic circuits.

Variations of the embodiments will be readily apparent to those skilled in the art. Accordingly, it is to be understood that although the present invention has been described with references to preferred embodiments, various modifications, known to those skilled in the art, may be made to the structures and steps presented herein without departing from the invention, which is defined in the claims appended hereto.

The detailed workings of the processor and circuits, etc., set forth herein will also be readily apparent to those skilled in the art. In addition, those skilled in the art will recognize that the circuits and functions set forth may be realized by microprocessors, catalog and custom integrated circuits, etc., or combinations thereof as a matter of engineering choice.

What is claimed as new and desired to be protected by Letters Patent of the United States is:

1. A test system for testing an electronic circuit, said test system comprising:

a controller for testing the electronic circuit, said controller having a first connector; and an application attachment having a second connector connectable to said first connector and a third connector connectable to the electronic circuit, said application attachment including a memory storing configuration data and a test program, said controller using the test program stored in said memory to test the electronic circuit.

2. The test system of claim 1, wherein the electronic circuit is an integrated circuit memory device.

3. The test system of claim 2, wherein the test program is a memory erase time test program.

4. The test system of claim 2, wherein the test program tests for failed memory locations in the integrated circuit memory device.

5. The test system of claim 1, wherein the electronic circuit is a memory circuit.

6. The test system of claim 5, wherein the test program is a memory erase time test program.

7. The test system of claim 5, wherein the test program tests for failed memory locations in the memory circuit.

8. The test system of claim 1, wherein said memory is a non-volatile memory device.

9. The test system of claim 1, wherein said memory is a flash memory device.

10. The test system of claim 1, wherein said application attachment further comprises a logic circuit connected between said second and third connectors.

11. A test system for testing an integrated circuit, said test system comprising:

a controller for testing the integrated circuit, said controller having a first connector; and an application attachment having a second connector connectable to said first connector and an integrated circuit socket connectable to the integrated circuit, said application attachment including a memory storing configuration data and a test program, said controller using the test program stored in said memory to test the integrated circuit.

12. The test system of claim 11, wherein the integrated circuit is an integrated circuit memory device.

13. The test system of claim 12, wherein the test program is a memory erase time test program.

14. The test system of claim 12, wherein the test program tests for failed memory locations in the integrated circuit memory device.

15. The test system of claim 11, wherein said memory is a non-volatile memory device.

16. The test system of claim 11, wherein said memory is a flash memory device.

17. The test system of claim 11, wherein said application attachment further comprises a test circuit connected between said second connector and said integrated circuit socket.

* * * * *